(12) United States Patent
French et al.

(10) Patent No.: US 12,379,615 B2
(45) Date of Patent: Aug. 5, 2025

(54) LENS WITH COLOR ENHANCEMENT

(71) Applicant: Essilor International, Charenton-le-Pont (FR)

(72) Inventors: Elliot French, Dallas, TX (US); Srinivasan Balasubramanian, Dallas, TX (US)

(73) Assignee: Essilor International, Charenton-le-Pont (FR)

( * ) Notice: Subject to any disclaimer, the term of this patent is extended or adjusted under 35 U.S.C. 154(b) by 0 days.

(21) Appl. No.: 18/525,989

(22) Filed: Dec. 1, 2023

(65) Prior Publication Data

US 2024/0094562 A1 Mar. 21, 2024

Related U.S. Application Data

(63) Continuation of application No. 16/973,580, filed as application No. PCT/EP2019/065162 on Jun. 11, 2019, now Pat. No. 12,007,628.

(30) Foreign Application Priority Data

Jun. 12, 2018 (EP) .................................... 18305723

(51) Int. Cl.
*G02C 7/10* (2006.01)
*B29D 11/00* (2006.01)
*G02C 7/12* (2006.01)

(52) U.S. Cl.
CPC ........ *G02C 7/107* (2013.01); *B29D 11/00644* (2013.01); *B29D 11/0073* (2013.01); *B29D 11/00894* (2013.01); *G02C 7/104* (2013.01); *G02C 7/12* (2013.01); *G02C 2202/16* (2013.01)

(58) Field of Classification Search
CPC .......... G02C 7/107; G02C 7/104; G02C 7/12; G02C 2202/16; B29D 11/00644; B29D 11/0073; B29D 11/00894; B29D 11/00432; B29D 11/00865
USPC ...................................................... 351/159.56
See application file for complete search history.

(56) References Cited

U.S. PATENT DOCUMENTS

| | | | |
|---|---|---|---|
| 2011/0255051 A1 | 10/2011 | Mccabe et al. | |
| 2013/0141693 A1* | 6/2013 | McCabe | B29D 11/00865 351/159.56 |
| 2013/0271725 A1 | 10/2013 | Huang et al. | |
| 2014/0233105 A1 | 8/2014 | Schmeder et al. | |

(Continued)

FOREIGN PATENT DOCUMENTS

| | | |
|---|---|---|
| CN | 102947680 A | 2/2013 |
| CN | 103688145 A | 3/2014 |

(Continued)

OTHER PUBLICATIONS

Office Action, issued in Korean Patent Application No. 10-2020-7034149 dated Mar. 13, 2024.

(Continued)

*Primary Examiner* — William R Alexander
(74) *Attorney, Agent, or Firm* — NIXON & VANDERHYE

(57) ABSTRACT

Embodiments of the disclosure relate to the use of dyes that impart localized regions of reduced transmittance across specific wavelength ranges. The inclusion of transmittance-attenuating dyes into a lens provides enhanced color contrast by tuning the spectrum of visible light transmission through the lens.

2 Claims, 4 Drawing Sheets

(56) References Cited

U.S. PATENT DOCUMENTS

| | | |
|---|---|---|
| 2017/0090217 A1 | 3/2017 | Nahm et al. |
| 2017/0235160 A1 | 8/2017 | Larson |
| 2017/0261768 A1 | 9/2017 | Ambler et al. |
| 2017/0299895 A1 | 10/2017 | Larson |
| 2018/0173015 A1 | 6/2018 | Carlson et al. |
| 2019/0137789 A1 | 5/2019 | Larson |
| 2020/0096792 A1 | 3/2020 | Mccabe et al. |
| 2022/0107511 A1 | 4/2022 | Mccabe et al. |

FOREIGN PATENT DOCUMENTS

| | | |
|---|---|---|
| CN | 104040412 A | 9/2014 |
| CN | 106646712 A | 5/2017 |
| JP | 2013524300 A | 6/2013 |
| JP | 2014513315 A | 5/2014 |
| JP | 2015513686 A | 5/2015 |
| KR | 20180063212 A | 6/2018 |
| WO | 2011130314 A1 | 10/2011 |
| WO | 2012119158 A1 | 9/2012 |
| WO | 2016118193 A1 | 7/2016 |
| WO | 2017189242 A1 | 11/2017 |
| WO | 2018011613 A1 | 1/2018 |

OTHER PUBLICATIONS

International Search Report for PCT/EP2019/065162 mailed Aug. 8, 2019, 3 pages.

Office Action issued in Chinese Patent Application No. 201980037866.0 dated Dec. 31, 2021.

Office Action issued in Japanese Patent Application No. 2020-568799 dated Mar. 13, 2023.

Written Opinion of the ISA for PCT/EP2019/065162 mailed Aug. 8, 2019, 6 pages.

* cited by examiner

LENS WITH COLOR ENHANCEMENT

CROSS REFERENCE TO RELATED APPLICATIONS

This application is a Continuation of application Ser. No. 16/973,580, filed on Dec. 9, 2020, which is the National Phase under 35 U.S.C. § 371 of International Application No. PCT/EP2019/065162, filed on Jun. 11, 2019, which claims the benefit under 35 U.S.C. § 119(a) to patent application Ser. No. 18/305,723.1, filed in Europe on Jun. 12, 2018, all of which are hereby expressly incorporated by reference into the present application.

FIELD OF THE INVENTION

The invention relates to ophthalmic lenses having a plurality of light attenuating dyes. The inclusion of a plurality of light attenuating dyes affords enhanced color contrast by selectively filtering specific light wavelength ranges.

BACKGROUND

Electronic displays have traditionally included contrast-adjustment controls for tuning the picture to fit the preference of the viewer. In visual perception of the real world, modulation of contrast is a relatively new technology.

Contrast is the difference in color that makes one object distinguishable from another object. Contrast is determined by the difference in color and brightness between different objects within the same field of view. In order to adjust contrast for real world color perception, lenses must be capable of tuning specific frequency ranges of visible light that are transmitted through the lens. For example, attenuating transmittance of green and red light results in enhanced perception of blue and yellow light.

Although contrast enhancement is subjective based on individual preferences of lens wearers, certain contrast-enhancing features can be combined to enhance perception of primary colors. For example, reducing light transmission in the wavelength regions that overlap the primary colors enhances the primary colors.

Contrast enhancing features can also be combined with polarizing filters for improved contrast enhancement. Glare observed in outdoor conditions, which is specularly reflected sun light, is often partially polarized white light and compounds reflected light from colored surfaces. Glare typically saturates the hue of natural surface colors. Blocking the hue-saturating glare is an additional method for enhancing color contrast.

Today, as a result of improved understanding of the physics of vision, lenses can be produced that protect a user's eyes from UV light, IR light, and glare by selectively filtering light traveling through the lens. There is a need in the industry, however, for improving the perception of primary colors and enhancing color contrast.

SUMMARY

The invention relates to the ophthalmic lens described in claim 1. Other advantageous and non-limitative features of this ophthalmic lens are described in the claims. Disclosed herein are methods for incorporating specific combinations of color-reducing dyes into lenses for improving color contrast. Transmittance-attenuating dyes provide localized regions of reduced light transmission across specific wavelength regions, i.e., localized transmittance minima. By incorporating dyes that reduce light transmittance across specific regions, non-reduced wavelength regions appear as regions with relatively higher transmittance, i.e., localized transmittance maxima. The inclusion of specific dyes into a lens enhances color contrast by tuning local minima and maxima to achieve the desired transmission spectrum.

Transmittance-attenuating dyes can be selected to reduce transmittance across a desired wavelength range. Dye concentration can be selected to adjust the degree of reduction in transmittance. The total number of dyes can be adjusted to customize the transmission spectrum. By combining multiple dyes, various transmittance profiles can be tailored for specific applications.

In some aspects, a method for producing an ophthalmic lens comprising a polymerized lens comprising at least one polymer, and a lens component configured to impart reduced light transmittance over a plurality of wavelength regions is provided. The lens component configured to impart reduced light transmittance over a plurality of wavelength regions may include at least two dyes, each of which imparts a region of reduced light transmittance. In some embodiments, the lens polymer is a polycarbonate (PC) resin.

In one embodiment, a first light transmittance-reducing dye may be selected to impart a first region of reduced light transmittance having a center located between about 485 nanometers and 510 nanometers. In some aspects, a second light transmittance-reducing dye may be selected to impart a second region of reduced light transmittance having a center located between about 570 nanometers and 600 nanometers of reduced light transmittance. In some aspects, a second light transmittance-reducing dye may be selected to impart a second region of reduced light transmittance having a center located between about 685 nanometers and 715 nanometers. In some embodiments, the light transmittance-reducing dye selected to impart a region of reduced light transmittance having a center located between about 570 nanometers and 600 nanometers is employed as a third, optional light transmittance-reducing dye. In some embodiments, the light transmittance-reducing dye selected to impart a region of reduced light transmittance having a center located between about 685 nanometers and 715 nanometers is employed as a third, optional light transmittance-reducing dye. In some embodiments, reduced light transmittance is defined as a reduction in % transmittance of at least 50% as compared to a region outside a reduced light transmittance region and between 400 nanometers and 680 nanometers.

In some aspects, the lens component configured to impart reduced light transmittance is a polymerized lens. The polymerized lens may include a blend of at least one polymer and the light-transmittance reducing dyes. Lenses may optionally be fitted with one or more polarizing layers to produce sunglass applications with tailored transmittance-reduction regions. Both prescription and plano lenses having localized attenuated transmittance regions may be produced. Various lens embodiments can be tailored and produced for specific lens environments, including general color enhancement, driving glasses, lenses for foggy conditions, lenses for snow/skiing, fishing, flying, hunting, and other environments in which reduction of transmittance across specific color regions can be utilized to enhance color perception and differentiation of colors.

When the light-transmittance reducing dyes are incorporated into a polarizing wafer construct, the wafer construct imparts reduced light transmittance properties onto the lens. The polarizing wafer construct may include at last one layer comprising the light transmittance-reducing dyes. In some embodiments, the at least one layer comprising the light transmittance-reducing dyes may be an injection-molded layer comprising a blend of a polymer and the dyes. In other embodiments, the at least one layer comprising the light transmittance-reducing dyes is a film layer adhered to the polarizing wafer construct.

In some embodiments, the lens component configured to impart reduced light transmittance is a coating matrix. A high refractive index coating matrix may be provided to increase refractive index, in some embodiments. A durability-enhancing coating matrix may be provided to impart hot water resistance, weathering resistance, light resistance, scuffing resistance, abrasion resistance, and/or impact resistance to the lens. A coating matrix may be provided to a concave or convex lens surface. Non-limiting examples of coating matrices include polyurethane- and epoxy-based coating matrices.

In some embodiments, the lens component configured to impart reduced light transmittance is a multilayer interferential film stack. A plurality of transmittance-attenuating dyes can be incorporated into an interferential stack that interferes with or modifies properties of light transmitted through the interferential stack. One example of an interferential stack comprises a plurality of interferential thin layers. Alternating layers of a dielectric material of high refractive index and a dielectric material of low refractive index may be provided to a lens substrate to reduce its light reflection and therefore to increase its light transmission. In some aspects, an interferential stack comprises a metal organic framework. In some aspects, the multilayer interferential film stack is a film laminate residing on a surface of the ophthalmic lens. The surface of the ophthalmic lens may be the concave surface or the convex surface. In some embodiments, the multilayer interferential film stack resides on or within the polarizing wafer construct.

In some embodiments, a plurality of light transmittance-reducing dyes may be incorporated into an adhesive. The adhesive may then be incorporated in the lens to adhere two layers to one another. In some embodiments, the adhesive comprising a plurality of light transmittance-reducing dyes is an adhesive layer within a polarizing wafer construct. In some embodiments, the adhesive comprising a plurality of light transmittance-reducing dyes resides between a polarizing wafer construct and a polymerized lens. In some embodiments, a tint layer may be provided with a plurality of light transmittance-reducing dyes. The light transmittance-reducing dyes may then be incorporated into or onto a lens by conventional tinting methods known to those of skill in the art.

In some embodiments, a polarizing wafer construct comprises an inner polyvinyl alcohol polarizing layer residing between two outer layers, wherein each outer layer is independently made from polycarbonate, cellulose triacetate, polyamide, thermoplastic polyurethane, or poly(methyl methacrylate). In some embodiments, a polymerized lens base material may be provided with additional components for reducing the transmittance of UV and/or short-wavelength blue light.

In some embodiments, light transmittance-reducing dyes are independently provided in amount ranging from 1 to 100 ppm. This range may be adjusted to include values outside this range if warranted. For example, a composition in which a light transmittance-reducing dye is sparing soluble may have less than 1 ppm of the dye. By contrast, a composition in which a light transmittance-reducing dye is very soluble may include greater than 100 ppm of the dye. The dyes may be selected from azo dyes, polymethyne dyes, arylmethyne dyes, polyene dyes, anthracinedione dyes, pyrazolone dyes, anthraquinone dyes, isoindolinone dyes, auinophtalone dyes, naphthalenediamine dyes, and carbonyl dyes.

Dyes are defined by the Ecological and Toxicological Association of Dyes and Organic Pigment Manufacturers as colored or fluorescent organic molecules which impart color to a substrate by selective absorption of light. Dyes are soluble and/or go through an application process which, at least temporarily, destroys any crystal structure by absorption, solution, and mechanical retention, or by ionic or covalent chemical bonds.

The phrases "transmittance reducing", "transmittance attenuating", "color absorbing" are used interchangably herein. "Ophthalmic lens," according to the disclosure, is defined as a lens adapted, namely for mounting in eyeglasses, whose function is to protect the eye and/or to correct vision. This lens can be an afocal, unifocal, bifocal, trifocal, or progressive lens. The ophthalmic lens may be corrective or un-corrective. Eyeglasses wherein ophthalmic lenses will be mounted could be either a traditional frame comprising two distinctive ophthalmic lenses, one for the right eye and one for the left eye, or like mask, visor, helmet sight or goggle, wherein one ophthalmic lens faces simultaneously the right and the left eyes. Ophthalmic lenses may be produced with traditional geometry as a circle or may be produced to be fitted to an intended frame. Ophthalmic lenses may be provided with at least one polarizing component to provide a polarized ophthalmic lens, for example, sunglasses.

A "polymerized lens comprising at least one polymer" can include a thermally-polymerizable composition, a photo-polymerizable composition, or a mixture thereof. A thermally-polymerizable composition is a composition where polymerization occurs upon exposure to an elevated temperature. A photo-polymerizable composition is a composition where polymerization occurs upon exposure to actinic radiation including, but not limited to, UV, visible, IR, microwave, etc. As used herein polymerizing or polymerization refer to a chemical reaction that results in bonding of one or more monomers or oligomers to each other to form a polymer.

Any embodiment of any of the disclosed compositions and/or methods can consist of or consist essentially of—rather than comprise/include/contain/have—any of the described elements and/or features and/or steps. Thus, in any of the claims, the term "consisting of" or "consisting essentially of" can be substituted for any of the open-ended linking verbs recited above, in order to change the scope of a given claim from what it would otherwise be using the open-ended linking verb.

The term "substantially" and its variations are defined as being largely but not necessarily wholly what is specified as understood by one of ordinary skill in the art, and in one non-limiting embodiment substantially refers to ranges within 10%, within 5%, within 1%, or within 0.5%.

The term "about" or "approximately" or "substantially unchanged" are defined as being close to as understood by one of ordinary skill in the art, and in one non-limiting embodiment the terms are defined to be within 10%, preferably within 5%, more preferably within 1%, and most preferably within 0.5%. The use of the word "a" or "an" when used in conjunction with the term "comprising" in the claims and/or the specification may mean "one," but it is also consistent with the meaning of "one or more," "at least one," and "one or more than one." As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The compositions and methods for their use can "comprise," "consist essentially of," or "consist of" any of the ingredients or steps disclosed throughout the specification. With respect to the transitional phase "consisting essentially of," in one non-limiting aspect, a basic and novel characteristic of the compositions and methods disclosed in this specification includes the compositions' abilities to reduce light transmittance over a plurality of wavelength regions.

Other objects, features and advantages of the present invention will become apparent from the following detailed description. It should be understood, however, that the detailed description and the examples, while indicating specific embodiments of the invention, are given by way of illustration only. Additionally, it is contemplated that changes and modifications within the spirit and scope of the invention will become apparent to those skilled in the art from this detailed description.

DETAILED DESCRIPTION

Various features and advantageous details are explained more fully with reference to the non-limiting embodiments that are illustrated in the accompanying drawings and detailed in the following description. It should be understood, however, that the detailed description and the specific examples, while indicating embodiments, are given by way of illustration only, and not by way of limitation. Various substitutions, modifications, additions, and/or rearrangements will be apparent to those of ordinary skill in the art from this disclosure.

In the following description, numerous specific details are provided to provide a thorough understanding of the disclosed embodiments. One of ordinary skill in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The color enhancement features disclosed herein may be provided to a lens through a variety of manufacturing methods. In some embodiments, the color enhancement features are afforded by incorporating one or more transmittance reducing dyes into at least one lens component. Although the methods by which the one or more dyes are provided, and the location of the one or more dyes within the lens may differ, comparable performance is achieved.

Examples

Method 1: Dyes Pre-Blended into Base Lens Resin

Method 1 was used to fabricate Examples A through D using a polycarbonate (PC) resin containing broad band UV absorbing dyes. In some examples, additional light attenuating dyes are included to further reduce % Tv and provide additional color enhancement. As used herein, a category 2 wafer has a % Tv in the range of 19%-45%, whereas a category 3 wafer has a % Tv in the range of 8%-18%. Different category wafers are employed to provide lenses with different % Tv.

Figure 2:
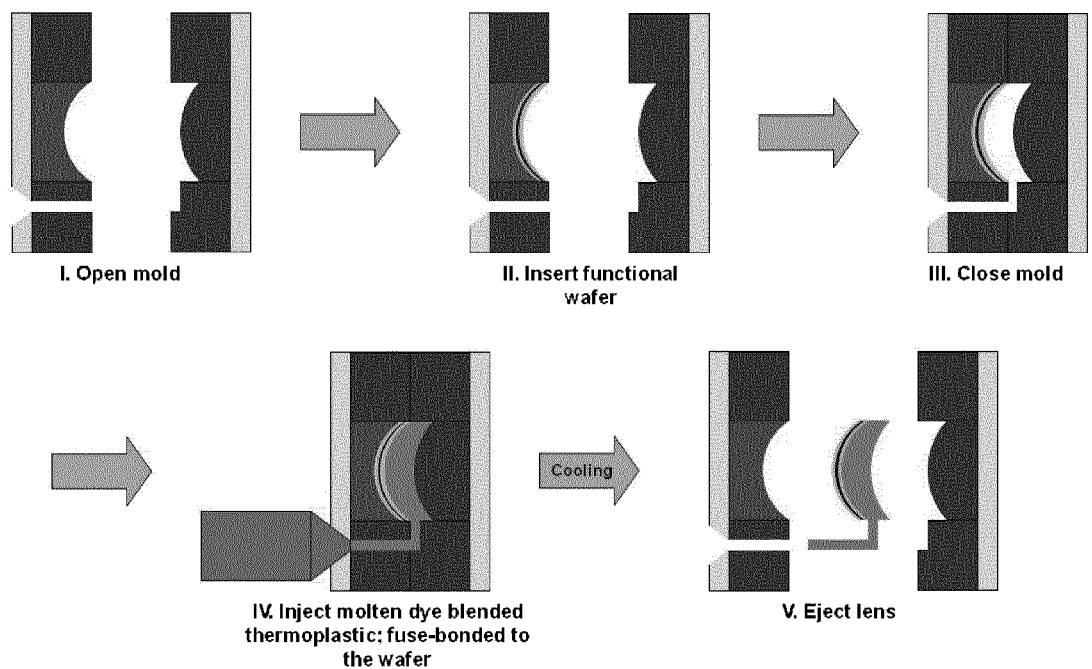
FIG. 2 is a schematic depicting the incorporation of transmittance-attenuating dyes into lens resin material.

Referring to the embodiment depicted in FIG. 2, a polarizing PC wafer having no color enhancing dyes was over-molded onto a pre-blended PC resin to provide a semi-finished (SF) lens. The pre-blended PC resin contained a mixture of two or three dyes formulated to provide two or three attenuated transmission spectral ranges, respectively.

Examples A and B included three dyes to provide transmission minima centered at around 495 nm, 585 nm and 700 nm. Examples C and D included two dyes to provide transmission minima centered at around 495 nm and 585 nm. The SF lenses were subsequently surfaced to plano (no vision correction) with a center thickness of 2 mm. All lenses were designed to meet ISO standards for driving (Q signals and % Tmin).

TABLE 1

| Spectral Region Transmittance Attenuating Dyes | |
|---|---|
| Dye Number | Attenuation Region Center |
| Dye 1 | 495 nm |
| Dye 2 | 585 nm |
| Dye 3 | 700 nm |

The dye concentrations identified in the Examples below are nominal concentrations. Actual concentrations may vary slightly from nominal concentrations due to losses that may occur during the tumbling, mixing, or other production processes.

Example A: Pre-Blended PC Resin+Category 2 Grey Wafer (% Tv~34%, Polarization Efficiency >97%)

TABLE 2

| Example A Pre-Blended PC Resin Dyes | |
|---|---|
| Dye Number | Concentration |
| Dye 1 | 22.8 ppm |
| Dye 2 | 33.8 ppm |
| Dye 3 | 22.4 ppm |

Example B: Pre-Blended PC Resin+Category 3 Grey Wafer (% Tv~17%, Polarization Efficiency >99%)

TABLE 3

Example B Pre-Blended PC Resin Dyes

| Dye Number | Concentration |
|---|---|
| Dye 1 | 23.8 ppm |
| Dye 2 | 32.1 ppm |
| Dye 3 | 8.9 ppm |

Example C: Pre-Blended PC Resin+Category 2 Grey Wafer (% Tv~34%, Polarization Efficiency >97%)

TABLE 4

Example C Pre-Blended PC Resin Dyes

| Dye Number | Concentration |
|---|---|
| Dye 1 | 22.3 ppm |
| Dye 2 | 33.8 ppm |

Example D: Pre-Blended PC Resin+Category 3 Grey Wafer (% Tv~17%, Polarization Efficiency >99%)

TABLE 5

Example D Pre-Blended PC Resin Dyes

| Dye Number | Concentration |
|---|---|
| Dye 1 | 22.3 ppm |
| Dye 2 | 32.1 ppm |

Example E: Pre-Blended PC Resin+Category 2 Wafer (% Tv~35%, Polarization Efficiency >99%)

TABLE 6

Example E Pre-Blended PC Resin Dyes

| Dye Number | Concentration |
|---|---|
| Dye 1 | 22.6 ppm |
| Dye 2 | 33.9 ppm |
| Airwear Color Blue G11 | 9.1% |

Example F: Pre-Blended PC Resin+Category 2 Wafer (% Tv~35%, Polarization Efficiency >99%)

TABLE 7

Example F Pre-Blended PC Resin Dyes

| Dye Number | Concentration |
|---|---|
| Dye 1 | 23.1 ppm |
| Dye 2 | 33.9 ppm |
| Dye 3 | 25.0 ppm |
| Airwear Color Blue G11 | 6.9% |

Figure 1A:
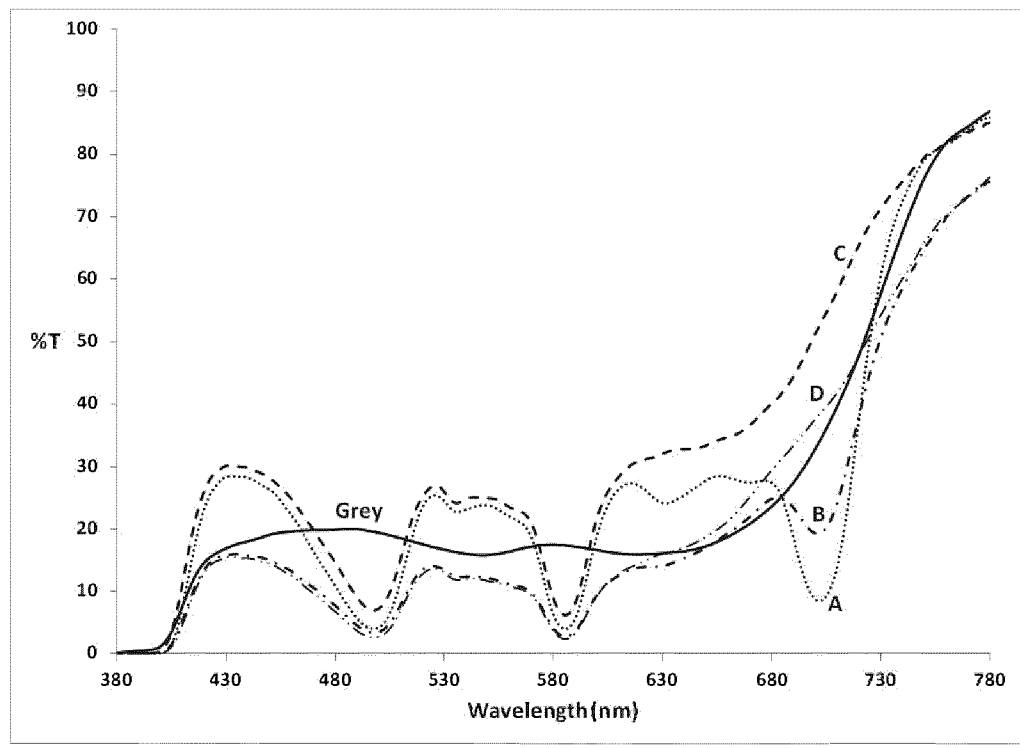
FIGS. 1A-1B are graphs depicting various lenses having multiple is a graph depicting transmission spectra of a base lens and various lens embodiments having multiple transmittance-attenuating dyes.

The transmission spectra of lens Examples A-D, along with that of a standard category 3 grey polarizing lens (with no color enhancement) are depicted in FIG. 1A. Example A includes three localized transmittance-attenuated regions owing to the inclusion of three dyes in the pre-blended PC resin. In Example B, the amount of Dye 3, having a transmittance-attenuating region centered at around 700 nm, was significantly reduced, in comparison to Example A. The transmission spectra of Example B shows a transmittance-attenuated region at around 700 nm in which the transmittance is greater than the corresponding region in Example A. These two Examples demonstrate that dye concentrations can be modified in order to selectively adjust transmittance in a desired region.

In the lenses corresponding to Examples C and D, two transmittance-attenuating dyes were included in the respective pre-blended PC resins. The Example C and D transmission spectra in FIG. 1A depict two localized transmittance-attenuated regions owing to the inclusion of two dyes in the pre-blended PC resins.

Figure 1B:
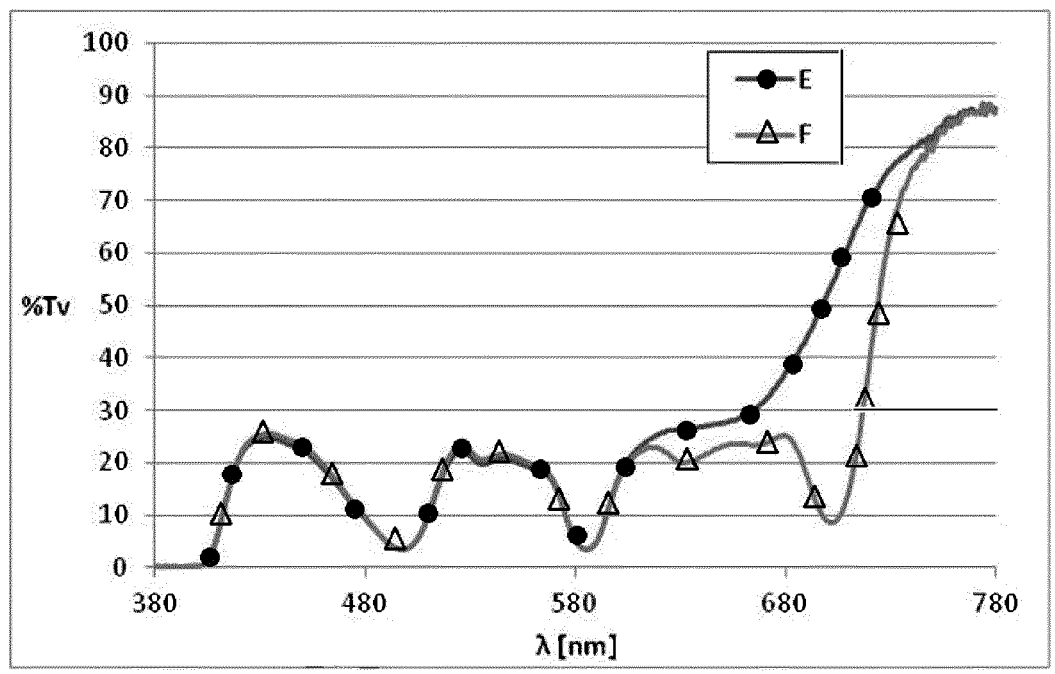

In the lenses corresponding to Examples E and F, the lens PC resin was pre-compounded with a combination of dyes (Airwear Color Blue G11) that absorb evenly in most wavelength regions and reduce total overall transmission. Two additional transmittance-attenuating dyes were added to the PC resin for Example E. Three additional transmittance-attenuating dyes were added to the PC resin for Example F. The Example E and F transmission spectra in FIG. 1B exhibit two and three localized transmittance-attenuating regions, respectively, owing to the inclusion of a corresponding number of dyes in the pre-blended PC resins.

Method 2: Dyes Incorporated into Polarizing Wafers

Transmittance-attenuating dyes can be incorporated into various lens components. In the embodiments described in Method 2, the dyes are integrated into one or more layers of a polarizing wafer construct. Options A and B below describe two distinct methods for incorporating transmittance-attenuating dyes into polarizing wafer constructs.

Figure 3A:
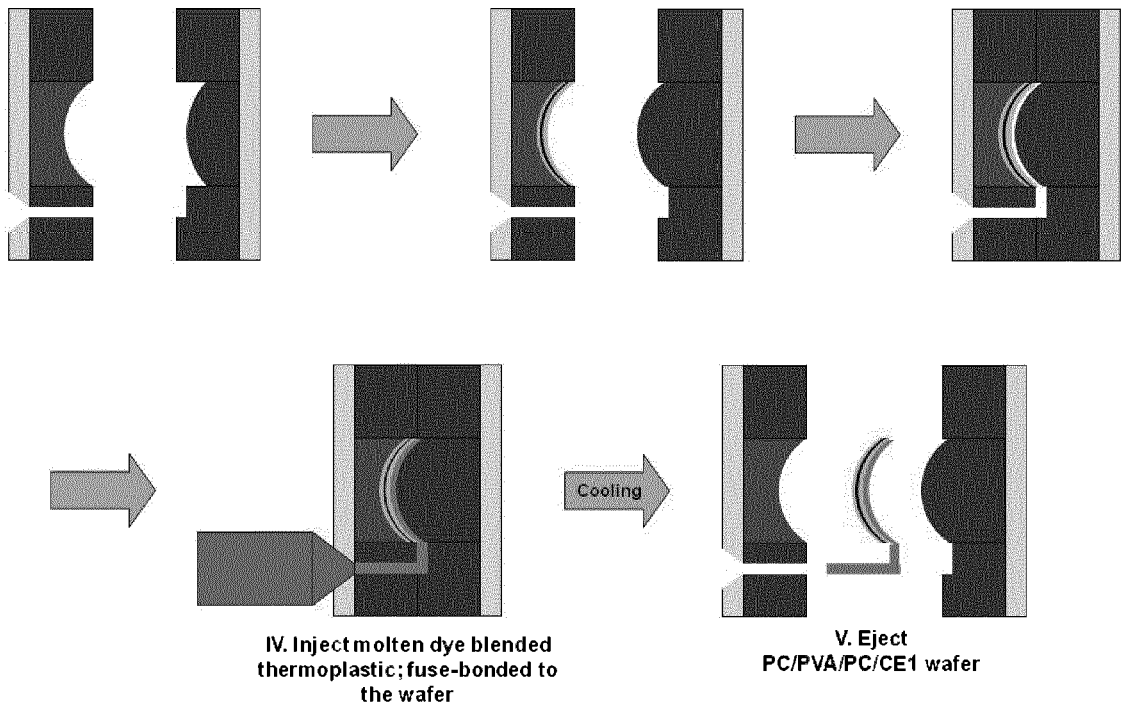
FIGS. 3A-3B are schematics depicting the incorporation of transmittance-attenuating dyes into a polarizing wafer construct by injection molding (FIG. 3A) and subsequent over-molding of the polarizing wafer construct onto an injection molded lens (FIG. 3B).

Option A: A polarizing wafer construct may be over-molded onto a thin resin layer having a plurality of dyes using an injection molding process. Referring to FIG. 3A, a polarizing wafer construct is inserted into a mold, and the mold is closed with adequate space for injection of a thin layer. A resin is then injected into the mold and fuse-bonds to the polarizing wafer construct. The thin injected layer includes a plurality of transmittance-attenuating dyes, and is designated "CE1" for its color-enhancing features.

Figure 3B:
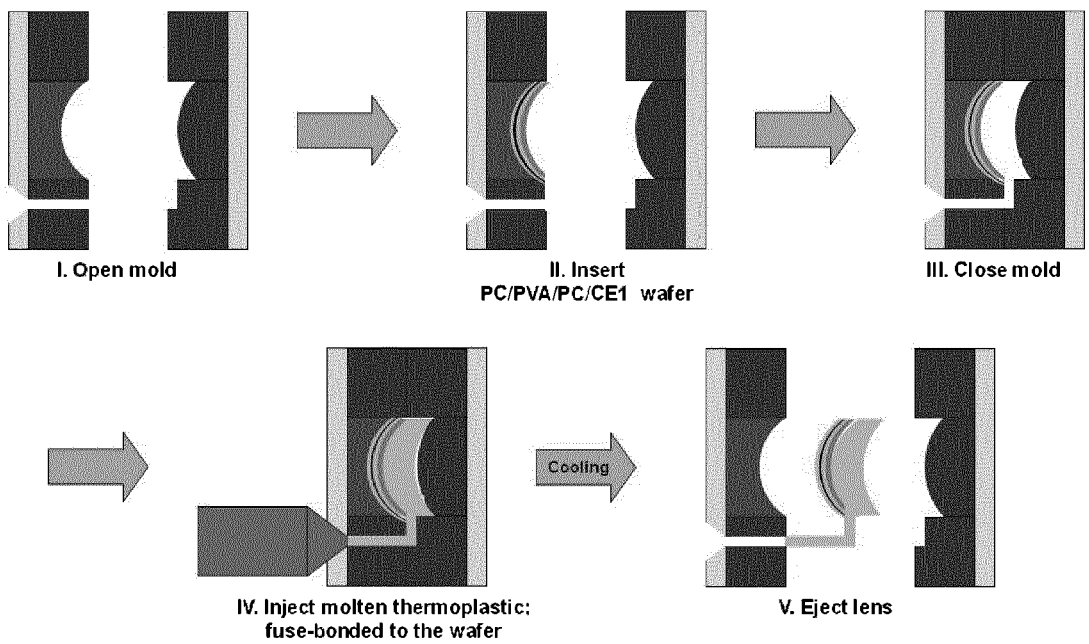

In the embodiment depicted in FIG. 3A, the polarizing wafer construct is a PC/PVA/PC polarizing wafer construct, and the injected resin is a thermoplastic resin having a plurality of transmittance-attenuating dyes. The exemplary PC/PVA/PC/CE1 polarizing wafer produced by this method is subsequently over-molded onto a semi-finished lens using a conventional clear resin, in accordance with the process depicted in FIG. 3B.

Figure 4:
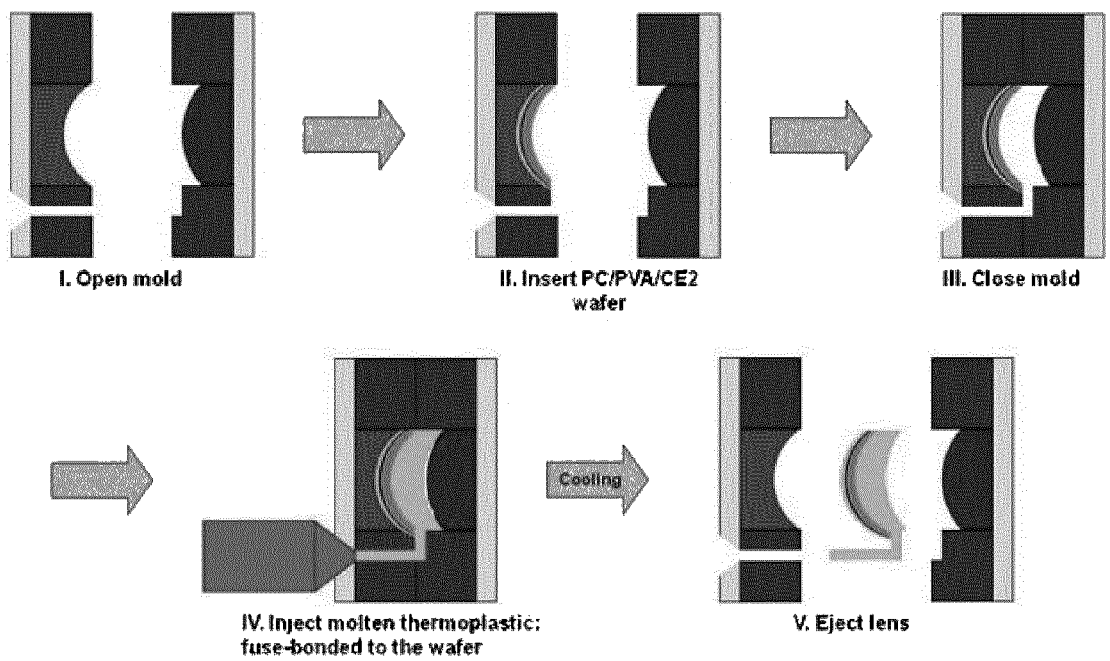
FIG. 4 a schematic depicting the incorporation of a film comprising transmittance-attenuating dyes into a polarizing wafer construct.

Option B: An optical quality film (CE2) having a plurality of transmittance-attenuating dyes may be laminated onto a polarizing laminate, for example, a PC/PVA polarizing laminate to provide a PC/PVA/CE2 polarizing wafer construct. As depicted in FIG. 4, the color-enhanced polarizing wafer construct may be over-molded onto a thermoplastic resin. The resulting lens includes dyes in the CE2 layer residing between the polarizing PVA layer and the base injection-molded lens. Because pre-manufactured films may be thinner than an injection-molded layer, Option B (film incorporation) is preferred over Option A (injection molding). The optical quality film (CE2) may be made or an optical resin selected from a variety of optical grade thermoplastics, including but not limited to PC, Nylon, and thermoplastic polyurethane (TPU).

Method 3: Dyes Incorporated Into A Coating Matrix

Transmittance-attenuating dyes may be integrated into a coating matrix that may subsequently be deposited onto a lens. A high refractive index coating matrix may be provided to increase refractive index. A durability-enhancing coating matrix may be provided to impart hot water resistance, weathering resistance, light resistance, scuffing resistance, abrasion resistance, and/or impact resistance to the lens. A coating matrix may be provided to a concave or convex lens surface, or anywhere between outermost lens surfaces.

Method 4: Dyes Incorporated Through Tinting Processes

Transmittance-attenuating dyes can incorporated into or onto an ophthalmic element by a tinting process. Transmittance-attenuating dyes can be incorporated into or onto a lens by either selecting transmittance-attenuating dyes that are specifically designed to adhere to the base lens material or substrate material to be tinted, or by first coating a base lens or other substrate with a thin veneer of resin which not only adheres to the lens or substrate but also has a high affinity for dyes. The dyes may be mixed and provided to the lens as a combination of dyes, or each dye may be provided separately. Standard tinting processes known to those of skill in the art may be employed, including but not limited to dip tinting and thermal transfer tinting (sublimation).

Method 5: Spectral Tuning by Using an Interferential Stack

Transmittance attenuation to selectively reflect light at specific wavelengths can be introduced by using an interferential stack that interferes with or modifies properties of light transmitted through the interferential stack. An interferential stack may comprise a plurality of interferential thin layers. Alternating layers of a dielectric material of high refractive index and a dielectric material of low refractive index may be provided to a lens substrate to reduce its light transmission in specific wavelength regions. Additionally a plurality of dyes can be introduced into an interferential stack to further attenuate light transmission through the interferential stack.

Method 6: Dyes Incorporated into Adhesive

A plurality of transmittance-attenuating dyes can be incorporated a lens adhesive. The dye-supplemented adhesive may subsequently be incorporated between lens layers to adhere the layers. In a non-limiting embodiment, one or more transmittance-attenuating dyes may be incorporated into an adhesive that is then used to adhere layers of a polarizing PC/PVA/PC laminate. The polarizing laminate may then be over-molded onto a SF as described in Method 1 above.

The claims are not to be interpreted as including means-plus- or step-plus-function limitations, unless such a limitation is explicitly recited in a given claim using the phrase(s) "means for" or "step for," respectively.

The invention claimed is:

1. An ophthalmic lens comprising:
    a polymerized lens comprising at least one polymer; and
    a lens component configured to impart reduced light transmittance over a plurality of wavelength regions, comprising:
        a first light transmittance-reducing dye configured to impart a first region of reduced light transmittance having a center located between about 485 nanometers and 510 nanometers;
        a second light transmittance-reducing dye configured to impart a second region of reduced light transmittance having a center located between about 570 nanometers and 600 nanometers; and
        a third light transmittance-reducing dye configured to impart a third region of reduced light transmittance having a center located between about 685 nanometers and 715 nanometers,
wherein reduced light transmittance is a reduction in % transmittance of at least 50% as compared to a region outside a reduced light transmittance region and between 400 nanometers and 680 nanometers,
wherein the ophthalmic lens comprises a polarizing wafer construct,
wherein the lens component configured to impart reduced light transmittance is an adhesive layer, and
wherein the adhesive layer resides between the polarizing wafer construct and the polymerized lens.

2. The ophthalmic lens of claim 1, wherein the polarizing wafer construct comprises an inner polyvinyl alcohol polarizing layer residing between two outer layers, wherein each outer layer is independently made from polycarbonate, cellulose triacetate, polyamide, thermoplastic polyurethane, or poly(methyl methacrylate).

* * * * *